United States Patent Office 3,629,436
Patented Dec. 21, 1971

3,629,436
CONCENTRATED CARBAMATE PESTICIDE WETTABLE POWDER FORMULATIONS
David A. Pearce, Edison, N.J., assignor to
Mobil Oil Corporation
No Drawing. Filed Oct. 4, 1968, Ser. No. 765,022
Int. Cl. A01n 9/12
U.S. Cl. 424—275         1 Claim

ABSTRACT OF THE DISCLOSURE

Wettable powders comprise at least 75 weight percent carbamate pesticide, carriers (talc, $SiO_2$), and as necessary adjuvants a combination of (1) 1–3 weight percent sodium lignosulfonate and (2) 1–5 weight percent of a mixture of equal parts of an alkylphenol-ethylene oxide condensation product (20–40 moles ethylene oxide per mole phenol), and sucrose monolaurate. These powders are compatible with organophosphorus emulsifiable concentrates, such as Methyl Parathion.

BACKGROUND OF THE INVENTION

Field of the invention

This invention relates to wettable powders. It is more particularly concerned with wettable powders containing high concentrations of carbamate pesticides, which are compatible with organophosphorus emulsifiable concentrates, such as Methyl Parathion.

Description of the prior art

When using wettable powders in the field, it is frequently the practice to use another wettable powder or an emulsifiable concentrate, in order to broaden the spectrum of pesticidal control. In the case of certain pesticides, such as carbamate pesticide wettable powders, however, it was found that they were incompatible with organophosphorus emulsifiable concentrates such as Methyl Parathion 4E, and that the mixture flocculates and forms a greasy solid that settles out rapidly. Insofar as is now known, the specific compatible wettable powder formulations of this invention have not been proposed.

SUMMARY OF THE INVENTION

This invention provides wettable powder formulations compatible with organophosphorus emulsifiable concentrates, that comprise at least 75 weight percent carbamate pesticide, carriers (talc, $SiO_2$) and, as necessary adjuvants, a combination of (1) 1–3 weight percent sodium lignosulfonate and (2) as a surfactant, 1–5 weight percent of a mixture of equal parts of an alkylphenol-ethylene oxide condensation product (20–40 moles ethylene oxide per mole phenol) and sucrose monolaurate.

DESCRIPTION OF SPECIFIC EMBODIMENTS

The essential components of the wettable powder formulation of this invention are a carbamate pesticide, at least one carrier, a dispersing agent, and a nonionic surfactant.

The carbamate pesticides contemplated for use in the wettable powders of this invention are carbamates having the formula:

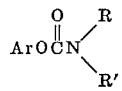

wherein Ar is an aromatic or heterocyclic group and R and R' are hydrogen or methyl. The aromatic and heterocyclic groups can be various mononuclear or polynuclear groups, such as phenyl, benzothienyl, naphthyl, benzofuryl, and o-isopropoxyphenyl.

The aromatic group, Ar, can contain various substituent groups, such as halo, nitro, amino, and alkyl groups. Typical pesticides within the contemplation of this invention are disclosed in U.S. Pats. Nos. 2,903,478, 3,060,225, 3,288,673, and 3,288,808. The amount of carbamate pesticide, based upon the total weight of wettable powder, will be at least 75 percent and generally about 75 percent to about 88 percent.

The dispersing agent used in the formulations of this invention is sodium lignosulfonate.

A typical sodium lignosulfonate utilized herein had the following analysis:

|  | Weight percent |
|---|---|
| Total sulfur | 1.70 |
| CaO | 0.20 |
| MgO | 0.02 |
| $Na_2O$ | 10.00 |
| —$OCH_3$ | 12.64 |
| pH of 3% aqueous solution | 8.5–9 |

The amount of dispersing agent used, based upon the total weight of wettable powder, will be between about 1 and about 3 percent.

The surfactant used in the formulations of this invention is a mixture of equal parts by weight of two nonionic surfactants. One of these is a condensation product of an alkylphenol with 20–40 moles ethylene oxide per mole alkylphenol. Such condensation products are commercially available, such as "Igepals" in which the phenol constituent is nonyl phenol. The other nonionic surfactant, which is also commercially available, is sucrose monolaurate. The amount of each component in the mixture used, based upon the total weight of the wettable powder, will be between about 0.5 percent and about 2.5 percent, making a concentration of mixture of between about 1 percent and about 5 percent.

The balance of the wettable powder formulation will be one or more of the usual dry, finely-divided diluents usually used in formulating wettable powders, such as talc, perlite, pyrophyllite, kaolin, and colloidal silica (average particle diameter of 22 millimicrons or less). In the case of silica, however, it was found that the potential for undesired coagulation increases when the concentration of silica, based upon the total weight of wettable powder, is about 7 percent or more.

In preparing the wettable powders of this invention, the aforedescribed ingredients are blended and mixed by methods generally known in the art, such as by air milling. When these wettable powders are diluted with water they form stable dispersions that can be readily sprayed. More significantly, they are compatible with organophosphorus emulsifiable concentrates and, when used with such concentrates in water diluent, form stable, sprayable dispersions that do not flocculate or form a greasy solid that settles out rapidly. The following examples illustrate the wettable powder formulations of this invention and demonstrate their compatibility.

EXAMPLE 1

The following mixture was blended and air-milled to form a wettable powder having a particle size range of 1–18 microns:

|  | Parts |
|---|---|
| N-methyl-4-benzothienylcarbamate | 88 |
| Talc | 1.5 |
| Sodium lignosulfonate | 2.0 |

Condensate of 30 moles ethylene oxide per mole
  nonyl phenol _____ 1.0
Sucrose monolaurate _____ 1.0
Colloidal silica _____ 6.5

|  | Formulation | | | | | | | |
| --- | --- | --- | --- | --- | --- | --- | --- | --- |
|  | 1 | | 2 | | 3 | | 4 | |
|  | In Methyl Parathion emulsion | In tap water | In Methyl Parathion emulsion | In tap water | In Methyl Parathion emulsion | In tap water | In Methyl Parathion emulsion | In tap water |
| Wettability | Good | Good | Fair | Fair | Poor | Poor | Poor | Poor |
| Flocculation: | | | | | | | | |
| (a) Immediate | None | None | None | None | None | None | Severe | None |
| (b) Overnight | Severe | do | Severe | do | do | do | Moderate | Severe |
| Re-suspension after overnight standing | Poor | Poor | Poor | Poor | Good | Fair | Fair | Poor |

Two mixtures of this wettable powder formulation were made, as follows:

(1)
4.5 g.—wettable powder
2.0 ml.—Methyl Parathion 4E
90 ml.—tap water (2)
4.5 g.—wettable powder
90 ml.—tap water Each mixture was placed in a 100 ml. graduate cylinder and agitated by inverting and righting each cylinder until dispersion was achieved. Then, the dispersions were let stand. Neither dispersion showed evidence of flocculation and less than 30 percent of solids settled out after ½ hour. On standing overnight, the suspensions had settled out, but rapidly re-suspended upon agitation and again no flocculation was evident.

EXAMPLE 2

Wettable powders were prepared identical to that of Example 1, except that other nonionic surfactants were used instead of the two of Example 1. The following wettable powders were prepared, by blending the ingredients and jet-milling to a particle size range of about 1–18 microns.

| Ingredients | Percent weight | | | |
| --- | --- | --- | --- | --- |
|  | 1 | 2 | 3 | 4 |
| N-Methyl-4-benzothienylcarbamate | 88.0 | 88.0 | 88.0 | 88.0 |
| Talc | 1.5 | 1.5 | 1.5 | 1.5 |
| Colloidal silica | 6.5 | 6.5 | 6.5 | 6.5 |
| Sodium lingosulfonate | 2.0 | 2.0 | 2.0 | 2.0 |
| Condensate of about 30 moles ethylene oxide per mole of nonyl phenol | 2.0 | | | |
| Phosphoric ester of an alkyl pheno-ethyleneoxide condensate (Gafac RE 960—Gen. Aniline) | | 2.0 | | |
| Sucrose mono-laurate | | | 2.0 | |
| Sucrose mono-tallowate | | | | 2.0 |
| Total | 100.0 | 100.0 | 100.0 | 100.0 |

The above powders were tested in the following manner:

(1) 4.5 grams of each powder were added to an emulsion of 2.0 ml. of 4 lbs./gal. Methyl Parathion emulsifiable concentrate in 90 ml. tap water (of about 200 p.p.m. hardness), in a graduated cylinder.

(2) 4.5 grams of each powder were added to 90 ml. tap water. After wettability was observed and the wettable powders had wet down, the cylinders were stoppered and inverted 10 times, and let stand for further observations. After overnight standing, the cylinders were re-inverted to observe re-suspension and the character of the settled materials.

Results were as follows:

It was noted that Formulation 1, containing an ethylene oxide condensate of nonyl phenol, had good wettability but poor overnight compatibility with Methyl Parathion emulsion. Also, Formulation 3, had poor wettability but good compatibility with Methyl Parathion. Formulations 2 and 4, containing other surfactants, had poor compatibility and poor to fair wettability.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claim.

What is claimed is:

1. A wettable powder having a particle size range of 1–18 microns consisting essentially of:

|  | Parts |
| --- | --- |
| N-methyl-4-benzothienylcarbamate | 88 |
| Talc | 1.5 |
| Sodium lignosulfonate | 2.0 |
| Condensate of 30 moles ethylene oxide per mole nonyl phenol | 1.0 |
| Sucrose monolaurate | 1.0 |
| Colloidal silica | 6.5 |

References Cited

UNITED STATES PATENTS

| 2,893,913 | 7/1959 | Wiedow | 424—218 |
| 2,903,478 | 9/1959 | Lambrech | 260—479 |
| 3,060,225 | 10/1962 | Shulgin | 260—479 |
| 3,193,452 | 7/1965 | Jäger et al. | 424—218 |
| 3,288,673 | 11/1966 | Kilsheimer et al. | 424—275 |
| 3,288,808 | 11/1966 | Kilsheimer et al. | 260—330.5 |
| 3,342,581 | 9/1967 | Woodward et al. | 424—218 X |
| 3,342,673 | 9/1967 | Kaufman et al. | 424—275 |

UNITED STATES PATENTS

Hass: "The Sugar Detergents," Manufacturing Chemist, vol. 29, pp. 152–53, 1958.

Osipow et al.: "Interaction of Sucrose Monolaurate with Other Surface-Active Agents," Journ. Am. Oil Chemists Soc., vol. 35, pp. 127–129, 1958.

D. J. FUNDERBURK, Assistant Examiner

STANLEY J. FRIEDMAN, Primary Examiner

U.S. Cl. X.R.

424—218